United States Patent
Pieruch et al.

(10) Patent No.: US 10,889,260 B2
(45) Date of Patent: Jan. 12, 2021

(54) AIRBAG CUSHION ASSEMBLY WITH ONE-WAY CHECK VALVES

(71) Applicant: Key Safety Systems, Inc., Sterling Heights, MI (US)

(72) Inventors: Martin Pieruch, Hochheim (DE); Matthias Volkmann, Kronberg (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 178 days.

(21) Appl. No.: 15/117,353

(22) PCT Filed: Feb. 10, 2015

(86) PCT No.: PCT/US2015/015096
§ 371 (c)(1),
(2) Date: Aug. 8, 2016

(87) PCT Pub. No.: WO2015/123156
PCT Pub. Date: Aug. 20, 2015

(65) Prior Publication Data
US 2016/0339866 A1    Nov. 24, 2016

Related U.S. Application Data (60) Provisional application No. 61/938,362, filed on Feb. 11, 2014.

(51) Int. Cl.
*B60R 21/36* (2011.01)
*B60R 21/239* (2006.01)
(Continued)

(52) U.S. Cl.
CPC ............ *B60R 21/36* (2013.01); *B60R 21/231* (2013.01); *B60R 21/233* (2013.01);
(Continued)

(58) Field of Classification Search
CPC ........ B60R 21/239; B60R 2021/23169; B60R 2021/23324; B60R 21/36
See application file for complete search history.

(56) References Cited

U.S. PATENT DOCUMENTS 4,262,931 A * 4/1981 Strasser ................ B60R 21/233
280/729
4,360,223 A * 11/1982 Kirchoff ............... B60R 21/233
280/729
(Continued)

FOREIGN PATENT DOCUMENTS

DE    102008029655 A1    12/2009
EP    1595751 A1    11/2005
(Continued)

OTHER PUBLICATIONS

Machine translation of DE 102008029655 (Year: 2018).*
(Continued)

*Primary Examiner* — Barry Gooden, Jr.
(74) *Attorney, Agent, or Firm* — Meunier Carlin & Curfman LLC (57) ABSTRACT

An airbag cushion assembly (10, 100) has an airbag cushion (12) and an inflator (20, 120). The airbag cushion has a plurality of inflatable chambers including a primary chamber (11, 111) configured to receive inflation gas and one or more additional chambers (14, 16, 114, 115, 116) for receiving inflation gas from the primary chamber (11, 111). The inflator (20, 120) is in communication with, or open to, the gas inlet of the primary chamber (11, 111). One or more of the additional chambers has one or more one-way gas flow check valves (30, 130) for receiving inflation gases into the chamber and preventing the received gases from back flowing to maintain the one or more additional chambers at full inflation when the airbag cushion is inflated and loaded.

14 Claims, 9 Drawing Sheets

(51) Int. Cl.
*B60R 21/233* (2006.01)
*B60R 21/231* (2011.01)

(52) U.S. Cl.
CPC .. *B60R 21/239* (2013.01); *B60R 2021/23169* (2013.01); *B60R 2021/23324* (2013.01)

(56) References Cited

U.S. PATENT DOCUMENTS

| | | | | |
|---|---|---|---|---|
| 5,458,366 | A * | 10/1995 | Hock | B60R 21/206 280/729 |
| 5,586,782 | A * | 12/1996 | Zimmerman, II | B60R 21/23138 280/730.2 |
| 8,851,508 | B1 * | 10/2014 | Rickenbach | B60R 21/232 280/729 |
| 9,045,109 | B2 * | 6/2015 | Rick | B60R 21/36 |
| 2002/0171232 | A1 * | 11/2002 | Abe | B60R 21/206 280/730.1 |
| 2006/0028004 | A1 * | 2/2006 | Oota | B60R 21/18 280/733 |
| 2006/0175809 | A1 * | 8/2006 | Yamaji | B60R 21/23138 280/729 |
| 2007/0114090 | A1 * | 5/2007 | Okamoto | B60R 21/36 180/274 |
| 2009/0020987 | A1 * | 1/2009 | Wipasuramonton | B60R 21/233 280/729 |
| 2009/0218798 | A1 * | 9/2009 | Garner | B60R 21/232 280/742 |
| 2009/0236829 | A1 * | 9/2009 | Tanaka | B60R 21/232 280/728.2 |
| 2011/0109070 | A1 * | 5/2011 | Tanaka | B60R 21/206 280/741 |
| 2011/0175334 | A1 * | 7/2011 | Miller | B60R 21/206 280/730.2 |
| 2011/0285114 | A1 | 11/2011 | Ohara et al. | |
| 2012/0112441 | A1 * | 5/2012 | Ohara | B60R 21/205 280/729 |
| 2012/0205898 | A1 * | 8/2012 | Picard | B60R 21/2338 280/730.1 |
| 2013/0133971 | A1 * | 5/2013 | Rick | B60R 21/36 180/274 |
| 2013/0341894 | A1 * | 12/2013 | Nakashima | B60R 21/233 280/730.2 |
| 2015/0042080 | A1 * | 2/2015 | Guerrero | B60R 21/233 280/729 |
| 2015/0069741 | A1 * | 3/2015 | Shimazu | B60R 21/18 280/728.3 |
| 2016/0001734 | A1 * | 1/2016 | Sommer | B60R 21/233 280/729 |

FOREIGN PATENT DOCUMENTS

| | | |
|---|---|---|
| EP | 1625980 A2 | 2/2006 |
| GB | 2496988 A | 5/2013 |
| JP | H10100827 A | 4/1998 |
| WO | 2013028106 A1 | 2/2013 |

OTHER PUBLICATIONS

Extended European Search Report relating to European Application No. 18175798.0, dated Nov. 7, 2018.

European Office Action relating to European Application No. 18175798.0, dated Sep. 20, 2019.

* cited by examiner

AIRBAG CUSHION ASSEMBLY WITH ONE-WAY CHECK VALVES

FIELD OF THE INVENTION

The present invention relates to airbags generally, more specifically to airbag cushions having inflatable chambers separated by one or more one-way gas flow check valves.

BACKGROUND OF THE INVENTION

Airbag cushions are generally made of a cloth fabric that is conveniently folded in a compact shape for stowing in various locations inside or even outside of a vehicle. The airbag cushion when deployed during an accident is rapidly inflated by an inflator, typically by igniting a pyrotechnic or gas pressure filled container or a hybrid combination activated by an igniter or squib triggered by a sensor device. On inflation, the airbag cushion unfolds as it inflates. Some airbags have vents to soften or lower the forces the cushion has on an occupant. These vents can be designed to open or close or change from open to closed in an active or passive manner dependent on the situation. In some applications, the airbag cushion does not require venting to soften the cushion, but instead requires maintaining high inflation pressures in the inflatable chamber to adequately protect a person from an object or a part of the vehicle. Often these situations can involve very large airbags requiring large volumes of inflation gases. If the cushion volume is too large, then multiple inflators may be required. Alternatively, the airbag may be required to be made as two separated cushions, each with its own inflator.

Side curtain airbags are one type having a large airbag cushion, and to lower the air volume needed, non-inflated regions are provided so only the areas where the occupant can be impacted are inflatable. This ability to know the occupant's position is aided by the use of seat belts.

In other circumstances, the location of the person to be protected is less certain, one example being pedestrian airbags. These airbags require providing cushioning between a person struck by a vehicle and the front windshield and two front or A pillars. As can easily be appreciated, the pedestrian protection airbag requires a large cushion, more particularly one that covers at least portions of the windshield and both pillars. Some solutions have been to provide two separated cushions with separate inflators. Ideally, the inflation of the pedestrian airbag does not totally obstruct the driver's view. Most importantly, the fully inflated bag or cushion should be able to absorb the blow of the pedestrian sufficiently that the hard surfaces of the pillars or lower windshield regions do not cause serious injuries to the head or neck. Ideally, this means the inflated cushion must be sufficiently thick or have a wide enough volume to prevent the front and rear panels to collapse locally allowing the head to hit the pillar or lower windshield. It is therefore desirable to either form the cushion with a very large volume or a very high pressure or a combination of both. Large volume requires bigger inflators or multiple inflators, high pressure requires stronger cushion material that is less gas permeable.

An objective of the present invention is to provide a superior airbag cushion for this pedestrian application without requiring bigger or more inflators and to do so in a very efficient design.

A second application wherein an airbag cushion is expected to provide locally high cushioning is the knee airbag application. In this application, the lower leg between the knee and the ankle is often is often broken due to the vehicle crushing toward those portions of the front passenger or driver. Ideally, an airbag cushion more suited to protect these extremities is needed. The present invention when configured in a knee airbag can provide added protection.

The present invention as described hereinafter provides a unique way to provide specific areas or chambers to increase cushioning protection.

SUMMARY OF THE INVENTION

An airbag cushion assembly has an airbag cushion and an inflator. The airbag cushion has a plurality of inflatable chambers including a primary chamber configured to receive inflation gas and one or more additional chambers for receiving inflation gas from the primary chamber. The inflator is in communication with, or open to, the gas inlet of the primary chamber. One or more of the additional chambers has one or more one-way gas flow check valves for receiving inflation gases into the chamber and preventing the received gases from back flowing to maintain the one or more additional chambers at full inflation when the airbag cushion is inflated and/or loaded by occupants or objects.

In one embodiment, the airbag cushion is formed as one large single inflation chamber and the one or more one-way gas flow check valves includes a separation wall affixed to an inside surface of the front and the rear panels dividing and sealing the airbag into the plurality of chambers. Each separation wall has one or more of the one-way gas flow check valves. Preferably, the separation wall has a width between the front and rear panel to allow the front panel and rear panel to fully separate on inflation by at least the width of the separation wall. Preferably, the width of the separation wall is sized to maintain the full inflation shape of the airbag cushion when formed as a large single chamber without any indentation caused by the separation wall.

In this embodiment, the invention can be made as a pedestrian airbag assembly for a vehicle having an airbag cushion and an inflator. The airbag cushion extends lengthwise when fully inflated to project in front of a first pillar and a second pillar and across at least a lower portion of a front windshield of the vehicle. The airbag cushion has at least three inflatable chambers including a central or primary chamber interposed between a first end chamber and a second end chamber. The inflator is in communication with the airbag cushion for inflating the cushion, preferably, through a gas inlet in the central or primary chamber. Between the central or primary chamber and each of the first end chamber and second end chamber are one or more one-way check valves for receiving inflation gases into each end chamber from the central or primary chamber and preventing the received inflation gases from each end chamber from back flowing and returning into the central chamber when inflated and/or loaded by occupants or objects.

In another embodiment, the airbag cushion can be made as a knee airbag assembly with a knee airbag cushion and a single inflator. The knee airbag cushion has a primary gas distribution inflation chamber for housing an inflator or is formed with a gas inlet for receiving inflation gases and further has a plurality of additional chambers. Each additional chamber is attached to an adjacent chamber and has an opening between adjacent chambers for receiving inflation gases. The inflator for providing inflation gases in or into the primary gas distribution chamber is either connected to the gas inlet of the primary gas distribution chamber or positioned therein said primary chamber. One or more of the additional chambers has the opening formed with a one-way gas flow check valve for receiving inflation gases on inflating, but preventing back flow or reverse flow into an adjacent additional chamber or primary chamber. Preferably, the additional chamber adjacent the primary gas distribution chamber has a one-way check valve. The primary gas distribution chamber projects extending from under a dash of a vehicle toward a front seat. Each additional chamber extends relative to the primary chamber further toward the front seat in a substantially vertically stacked arrangement of adjacent additional chambers.

More preferably, the knee airbag cushion has three additional chambers, two outer chambers providing leg protection and occupant restraint and one inner additional chamber forming part of and adjacent to the primary gas distribution chamber. Most preferably, the inner additional chamber has the one-way gas flow check valve positioned at the opening between the inner additional chamber and the adjacent outer chamber. This means the two outer chambers on full inflation are prevented from back flowing gases into the inner additional chamber or the primary gas flow distribution chamber.

The one-way gas flow check valve can be made as a fabric layer placed over an opening between adjacent chambers. The fabric layer is fixed to the cushion fabric so as to bulge open on receiving inflation gases and flattens adjacent the cushion fabric under a gas pressure sufficient to cause a back flow thereby closing the opening.

Alternatively, the one-way check valve can be formed as a folded fabric affixed at an end opposite the fold air tightly to an inner surface of the airbag cushion forming a separation wall. At the fold, unsupported by the airbag cushion, the fabric is cut to form one or more openings or channels, the one or more openings are opened by inflating gases, but are closed at the fold on any back flow pressure.

In an alternative embodiment, the one-way check valve can be made of coated fabric, polyethylene foil or air cushion fabric in the form of an elongated bag sewn, sealed or welded to the inside surface of the airbag cushion and having one, or more preferably, two or three elongated channels. On inflation, the bag acts as a sealed wall with the channels opened to pass received inflation gases and closed at the onset of any back flow.

BRIEF DESCRIPTION OF THE DRAWINGS

The invention will be described by way of example and with reference to the accompanying drawings in which.

DETAILED DESCRIPTION OF THE INVENTION

The present invention relates to a unique airbag cushion assembly 10 that provides a one-way check valve 30 for receiving inflation gases during inflation of an airbag cushion 12 and blocks reverse flow of gases from a portion of the airbag cushion 12 in order to prevent a deflation or lowering of pressure within certain regions of the airbag cushion 12. This invention is useful in any number of applications wherein a high pressure fully inflated cushioning is required and assists in protecting a vehicle occupant or even a pedestrian. In many applications, the airbag cushion is extremely large and the cushioning effect varies depending on the location. The occupant most critically needs to be protected from any hard surfaces of a vehicle that could be pushed into or the occupant thrown into. It is in these hardened areas that the occupant or a pedestrian is most vulnerable. In order to improve the performance of airbags, it has therefore been determined to be desirable if certain areas or regions within an airbag cushion can be particularly increased in terms of pressure and that increased pressure held over a longer period of time to insure the occupant or pedestrian is adequately protected. Many examples include side airbags, knee airbags and pedestrian airbags, but are not limited to only these applications. However, in these applications, the airbag cushion is typically very large and made of multiple chambers or can be made of multiple chambers or one large chamber wherein inflation gases and the volume of gases needed to inflate the cushion are extremely large. In side curtain airbags, it has been common practice to provide zones that are non-inflatable to reduce the amount of inflation gases needed to fill the critical areas of the side or curtain airbag.

In pedestrian airbags, the entire surface of the airbag cushion needs to be inflated. However, the region adjacent and in front of each frontal pillar is particularly critical in terms of providing adequate cushioning to prevent a pedestrian from striking his head or neck against a pillar, causing serious injury or death. It is further important that the airbag cushion of a pedestrian airbag be provided so that the added cushioning in the hardened regions of the pillars is not adversely affecting the driver's performance in terms of ability to see. In this fashion, it is common for the pedestrian airbag to only protect the lower portion of the windshield closest to the dash. It is in these lower hardened regions of the glass and/or the A pillars that the pedestrian is most vulnerable.

Figure 1:
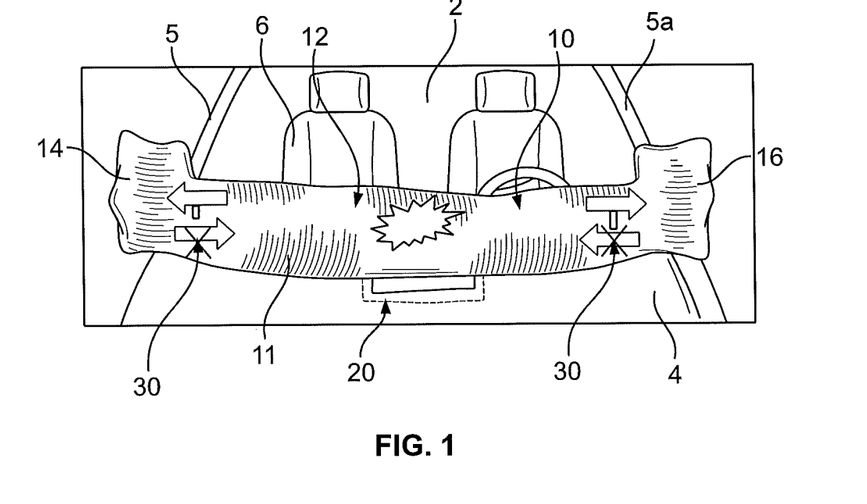
FIG. 1 is a frontal view of a first embodiment of the present invention showing the airbag cushion assembly as a pedestrian airbag in the deployed fully inflated state extending from under a vehicle hood up to at least a lower portion of the front windshield with ends in front of both A or front pillars.

With reference to FIG. 1, an exemplary first embodiment of the present invention is shown where the airbag cushion assembly 10 is formed as a pedestrian airbag. In FIG. 1, this pedestrian airbag 10 is shown in a deployed fully inflated state extending from under the vehicle hood 4 to at least a lower portion of the front windshield 6 with a primary chamber 11 and two projecting end chambers 14, 16 in front of both A or front pillars 5, 5a. These ends, as shown, are slightly enlarged and provide an area of protection for a pedestrian who is tossed up onto the vehicle 2 and will likely impact either the windshield 6 or the pillars 5. It has been determined that if the area in front of the pillars 5, 5a could be provided with a higher level of inflation and a larger amount of cushioning these areas could improve the performance of the pedestrian airbag 10 in the critical A pillar zones.

One of the critical aspects of the present invention is that the inflation gases from the centrally located inflator 20, shown in dashed lines, are delivered in such a fashion that a single inflator 20 can fill an airbag primary or central chamber 11 and pass those inflation gases through to the chamber ends 14, 16 of the airbag 10 in such a fashion that the single inflator 20 will sufficiently accommodate the entire pedestrian airbag 10. The arrow shows the direction of inflation gas flow, the arrow with the X shows that gas back flow is prevented by the one-way check valve 30. Importantly, the pedestrian airbag 10, as shown, can be provided in such a fashion that the coating normally applied across the entire inner surface of the airbag cushion 12 can be provided in localized areas.

Figure 2:
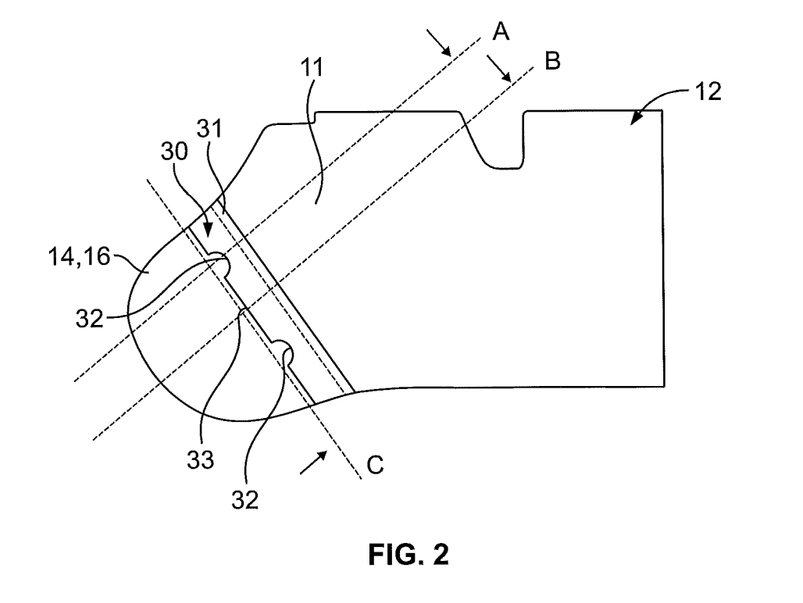
FIG. 2 is a plan view of a portion of an exemplary airbag cushion of the present invention showing the location of a one-way check valve.

With reference to FIG. 2, a plan view of a portion of the airbag cushion 12 is shown. In this plan view, a one-way check valve 30 is illustrated dividing the inner primary chamber 11 from the outer end chamber 14, 16 of the pedestrian airbag 10. The check valve 30, otherwise hidden by the cushion fabric, is shown in solid lines to distinguish it from the airbag 10 which is shown with the top panel removed to show the details of the check valve 30.

Figure 2A:
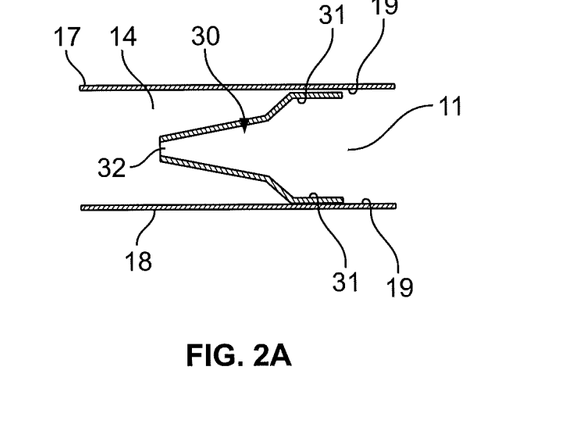
FIG. 2A is a section showing the opening of the one-way check valve taken along line A of FIG. 2.

With reference to FIG. 2A, a section drawn through line A-A of FIG. 2 is shown wherein the one-way check valve 30 is shown with a nozzle opening or channel 32 that is illustrated in an open position. In FIG. 2A, a front panel 17 and a rear panel 18 of the cushion 12 are separated by the inflation gases, as the airbag cushion 12 is inflating, this channel 32 is extended between the front and rear panel 17, 18 of the airbag cushion 12. As shown, the entire one-way check valve 30 is peripherally sealed at an end 31 around the entire adjacent inner surface 19 of the airbag cushion 12 such that it divides the airbag cushion 12 into the inner primary chamber 11 and the outer end chamber 14, 16. It is understood that the opposite or other end of the airbag (not shown) has a similar one-way check valve 30.

Figure 2B:
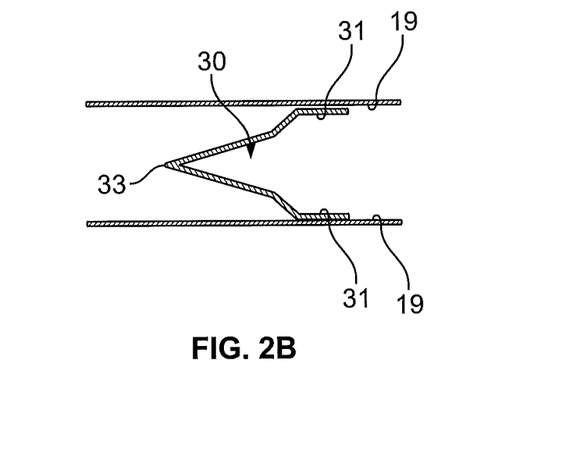
FIG. 2B is a section of the one-way check valve space from an opening showing a fold taken along line B of FIG. 2.

As shown in FIG. 2B, a section drawn through line B-B of FIG. 2 is shown spaced from the opening or channel 32 of the check valve 30 at a fold 33 closed to any gas flow.

Figure 2C:
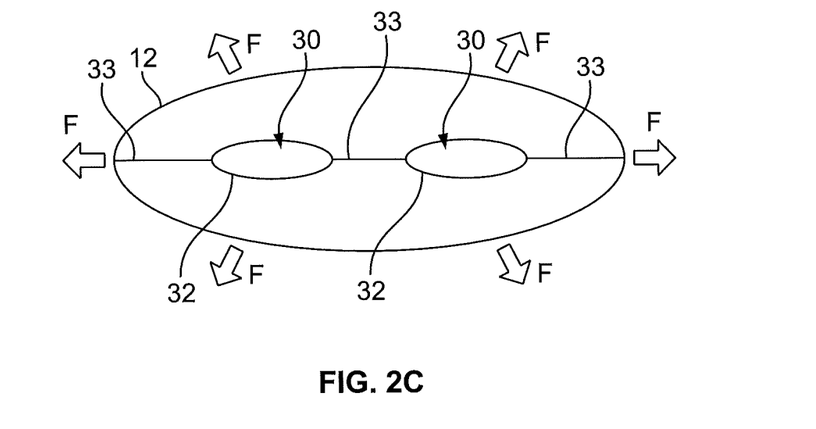
FIG. 2C is a plan view of the exemplary inflating airbag showing each opening or channel open to receive inflation gases across the one-way check valve when the downstream pressure Pa is less than the upstream pressure Pi in the primary chamber.
Figure 2D:
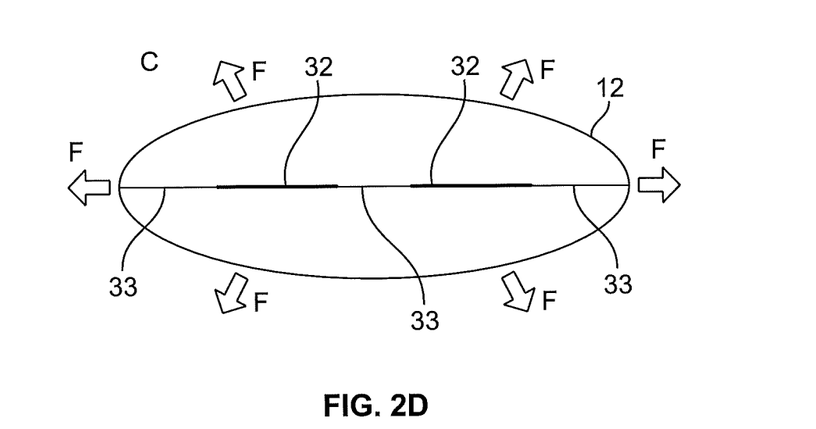
FIG. 2D is a plan view showing the check valve opening or channels closed when the inflation is full and met when the internal chamber pressure downstream of the check valve exceeds the upstream pressure Pi of the primary chamber.

With reference to FIG. 2C, when the airbag cushion 12 is inflated the open channel or opening 32 is fully expanded at initial inflation. At this point, the inflation gases in the inner chamber 11 are substantially greater than those at the end chambers 14, 16 and the inflation gases from the inflator 20 are driven through the channel 32 and into the ends 14, 16 filling them. Once the pressures equalize and the pressure of the inflation gases as driving towards the ends 14, 16, a reverse or back flow condition can occur when the pressure at the ends 14, 16 exceeds the pressure of the inner chamber 11. This can happen during impact. At this point, the channels 32 are closed and no air flow can occur back into the primary chamber 11, as shown in FIG. 2D. This advantageously maintains the end chambers 14, 16 in front of the pillars 5, 5a at a relatively high pressure when compared to the inner chamber 11. The inner chamber 11 has the largest volume and extends in front of the lower windshield 6 as illustrated in FIG. 1. The arrows in FIGS. 2C and 2D indicate the inflation force F directionally tensioning the airbag upon inflation.

Figure 3:
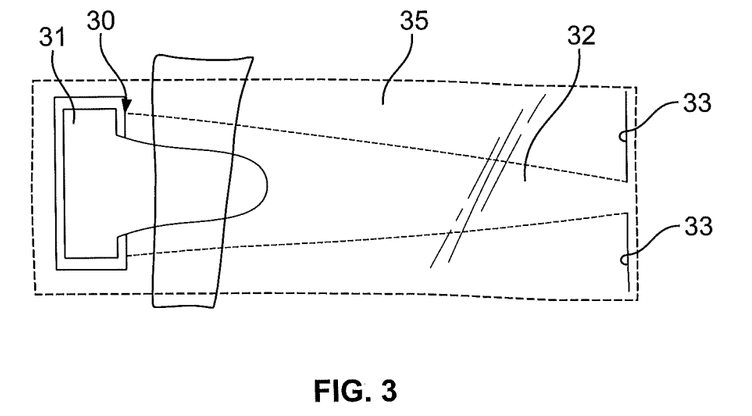
FIG. 3 is one example of a one-way check valve having at least one channel.

Reference is made to FIG. 3, an example of how the one-way check valve 30 can be made out of a light coated fabric or out of a polyethylene foil made out of layers 35 that are welded together or stitched in such a fashion that they form at least one channel opening 32. When these layers 35 are formed, the ends 31, 33 can be sealed or folded; however there will be an opening 32 allowing the gases to be received at one end and pass out through the distal end of the one-way check valve 30. Once the pressure is exceeded, as previously mentioned, in the extremes of the cushion the one-way check valve 30 will close automatically preventing back flow of gases.

Figure 4:
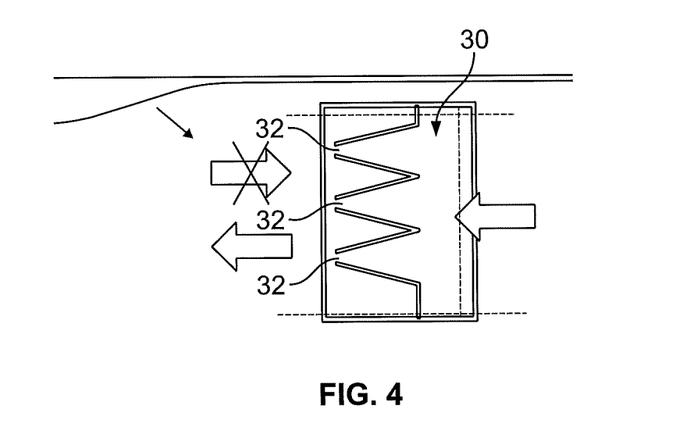
FIG. 4 is another example showing three chambers in the exemplary one-way check valve.

With reference to FIG. 4, this embodiment of the one-way check valve 30 is shown with multiple channels or openings 32. In such a fashion as illustrated, the one-way check valve 30 can have one, two or preferably three or more channel openings 32 all of which will react to a pressure such that they can be closed to prevent any back flow when the pressure on the downstream end of the check valve 30 exceeds the pressure on the upstream end. However, during inflation these valves 30 will remain open as the pressure in the primary chamber 11 is higher than the pressure in the extremities or ends 14, 16 of the cushion airbag 12. These one-way check valves 30 can be made with fabric that is folded and seamed or welded to the inner surface of the cushion airbag. Alternatively, they can be welded material or any other material that is sufficiently capable of opening on expansion and automatically in the face of a downstream pressure.

Figure 5:
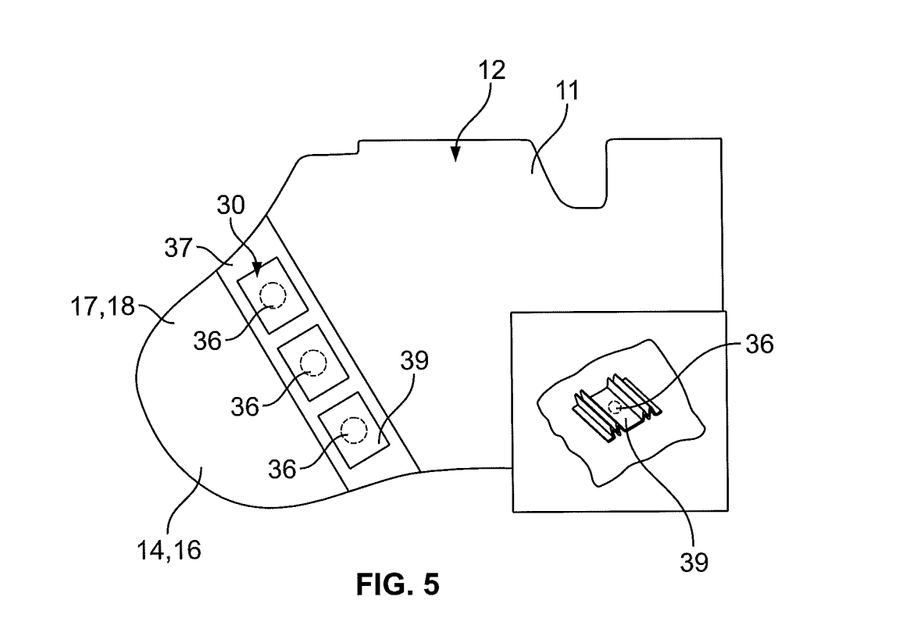
FIG. 5 is an alternative construction of a one-way check valve showing three openings each opening having a flow blocking fabric layer.
Figure 5A:
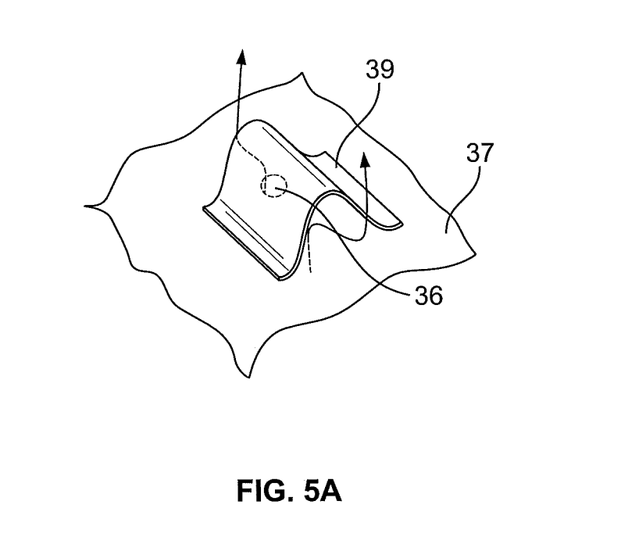
FIG. 5A shows the fabric layer bulging in the open valve condition at the onset of inflation.
Figure 5B:
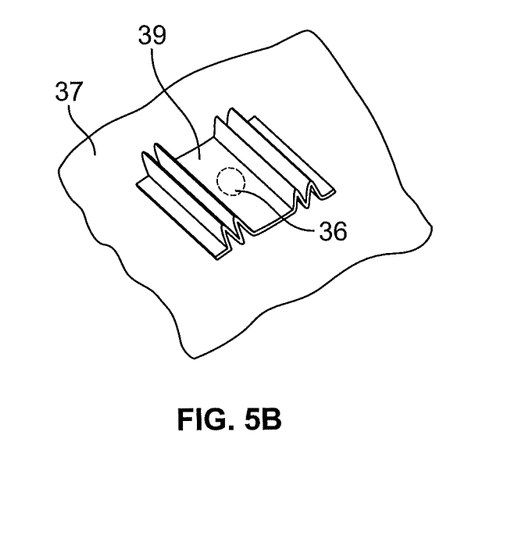
FIG. 5B shows the fabric layer flattened and sealing the opening under a back or reverse flow condition.
Figure 5C:
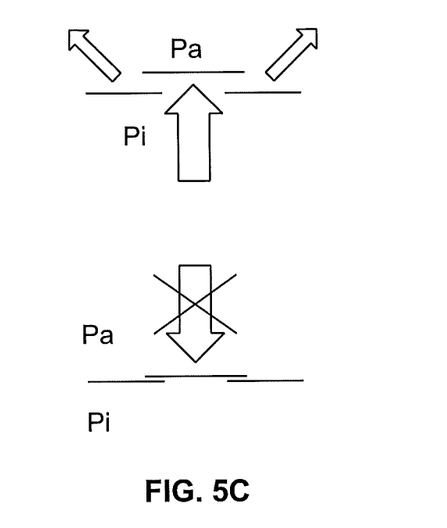
FIG. 5C is a schematic view showing both the open and closed valve conditions.

With reference to FIG. 5 an alternative method of making a one-way check valve 30 is illustrated wherein a separation wall 37 can be created internal of the airbag cushion front and rear panel 17, 18. On this separation wall 37, it is possible to provide openings 36 as shown; three openings are shown in FIG. 5. Overlaying the openings on the downstream side of each of the openings 36 are fabric layers 39. In FIG. 5 the top layer of fabric has been removed to show the construction of the check valve 30. These fabric layers are provided with a length sufficient that upon inflation the fabric layer 39 will expand and bulge outwardly as shown in FIG. 5A. FIG. 5A is an enlarged view of the one-way check valve fabric layer 39 from FIG. 5. During this expansion, the opening 36 is fully exposed and inflation gases enter into the ends of the end chambers 14, 16 of the cushion 12 from the inner primary chamber 11. Once the end chamber pressure Pa exceeds the inflation pressure Pi of the primary chamber as shown schematically in FIG. 5C, the fabric layer 39 will then close as illustrated in FIG. 5B; upon seeing a pressure at an extremity exceeding the pressure of the primary chamber this fabric layer or layers 39 will push back onto the opening 36 and effectively seal the opening 36 preventing any back flow or reverse flow of gases from an end chamber 14 or 16.

Figure 6:
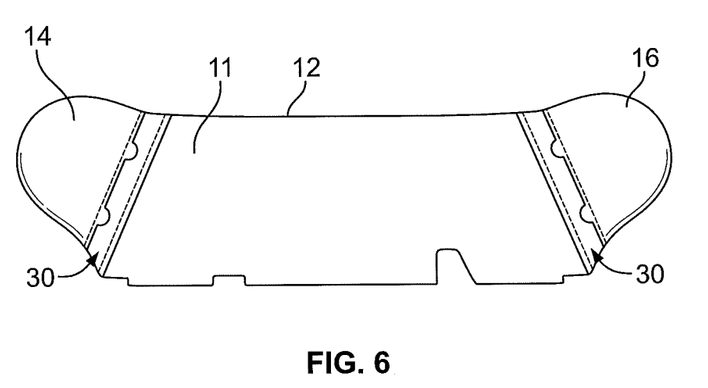
FIG. 6 shows a plan view of one embodiment where the airbag cushion has coated or an air impermeable treatment at the two ends on each side of the check valves with an uncoated primary chamber.

The advantages of the present invention as illustrated in FIG. 6, are that the airbag cushion 12 can be provided with only the ends 14, 16 coated with an air impermeable sealant such that the uncoated fabric in the center 11 is maintained. This insures that the coated ends 14, 16 on the downstream side of the check valve 30 are able to hold and maintain high inflation pressures. The uncoated fabric is more than sufficient to protect the pedestrian during a vehicle accident. This greatly reduces the cost of the pedestrian airbag 10 and simplifies its manufacture.

Figure 7:
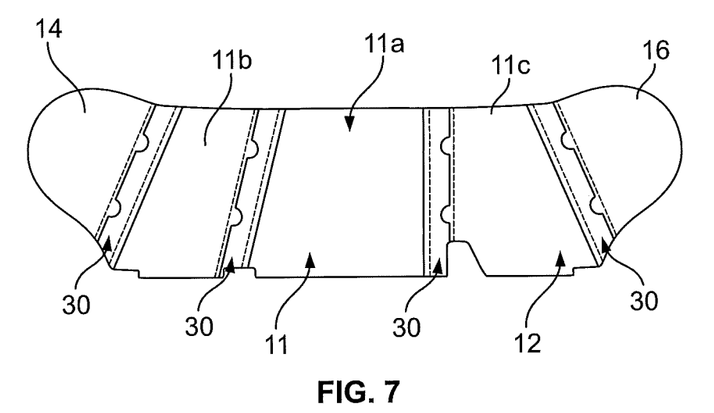
FIG. 7 is another alternative embodiment of the airbag cushion employing multiple chambers separated by one-way check valves.

In a further embodiment shown in FIG. 7, it is possible to provide multiple one-way check valves 30 in a series such that it separates the primary chamber 11 into several chambers 11A, 11B, 11C, each of which have to pass inflation gasses from an inflator 20 towards the ends passing through one or more check valve locations. These multiple locations further enhance the ability of driving the highest pressure to the farthest ends 14, 16 and the check valves 30 ensure that the back flow prevention is maintained in several locations.

Figure 8:
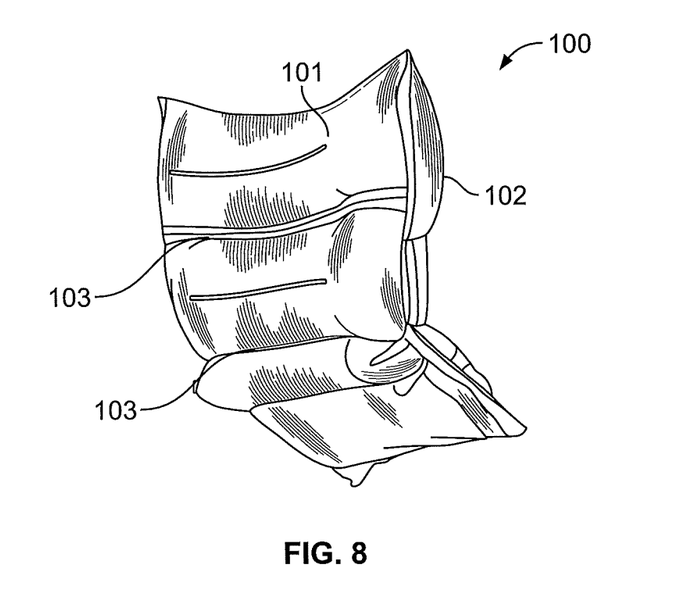
FIG. 8 is a perspective view of an inflated airbag cushion using the one-way check valve made as a knee airbag assembly.
Figure 9A:
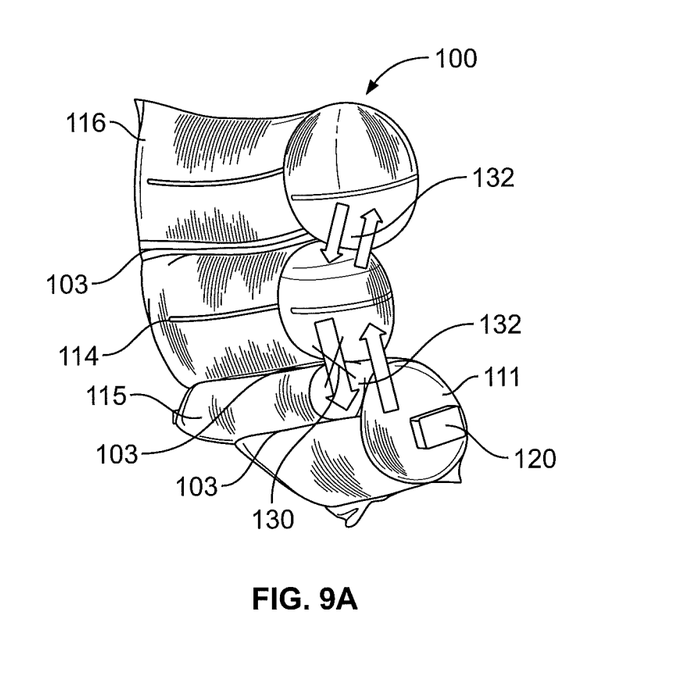
FIG. 9A is a view of the inflated knee airbag of FIG. 8 with a side removed showing how the one-way check valve blocks reverse flow.
Figure 9B:
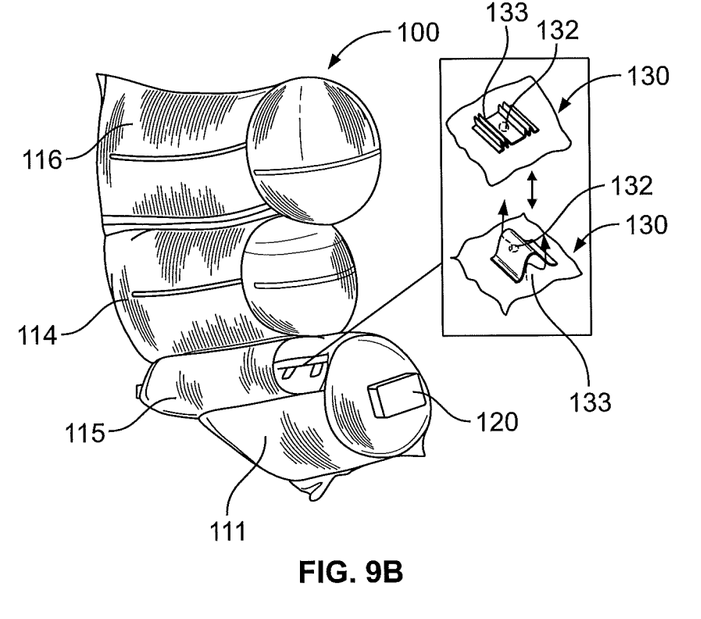
FIG. 9B is the view of FIG. 9A shown with an enlarged view of an exemplary check valve showing the open and closed configuration of the check valve.

With reference to another application of this unique one-way check valve design is illustrated in FIG. 8 showing a knee airbag cushion assembly 100. This knee airbag cushion assembly 100 is made substantially from a front panel 101 and rear panel 102 separated by chambers formed by stitching, seaming, welding or the like 103 the front and rear panels together at certain locations. As shown, this effectively creates a lower gas distribution or primary chamber 111 that has an inflator 120 as illustrated in FIG. 9A. The inflation gases inflator 120 can be positioned either at an inlet or inside the gas distribution chamber 111 and on inflation the inflator 120 will deliver gases through openings 132 communicating with each of the additional chambers. As shown, the primary gas distribution chamber 111 would be located preferably under the dash or instrument panel of the vehicle and would deploy outwardly in a generally horizontal or slightly inclined orientation toward the front seat of the vehicle. As shown, a small additional chamber 115 is provided adjacent the gas distribution primary chamber 111. This small chamber 115 has an opening 132 which allows for rapid inflation; as soon as the airbag 100 starts to inflate this additional chamber 115, which is slightly forward of the primary gas distribution chamber 111 and vertically on top of this chamber 111, passes gas to two additional chambers 114, 116 that are located vertically directly above this chamber 115. As a result, inflation gases continue to be delivered from the inflator 120 through the gas distribution chamber 111 through the additional small chamber 115 up through the two additional protection restraint chambers 114, 116. These additional chambers 114, 116 have openings 132 communicating with each other and upon inflation the gases fully inflate this knee airbag cushion 100. Once inflated, at least one one-way check valve 130 is positioned between the lower additional protection chamber 114 and the small additional chamber 115 connected to the gas distribution chamber 111. These one or more one-way check valves 130 as illustrated in FIG. 9B are similar to that previously discussed and can be any of those embodiments, however, it is believed preferable that the knee airbag 100 use the fabric layer 133 over an opening 132 such that it can be bulged out upon inflation, filling the protection additional chambers fully and upon reaching an inflation pressure exceeding that from the primary distribution chamber the fabric layer or layers closes back over the opening, sealing it. This effectively maintains the production restraint chambers in a fully inflated condition regardless of the condition of the lower chamber.

Figure 10:
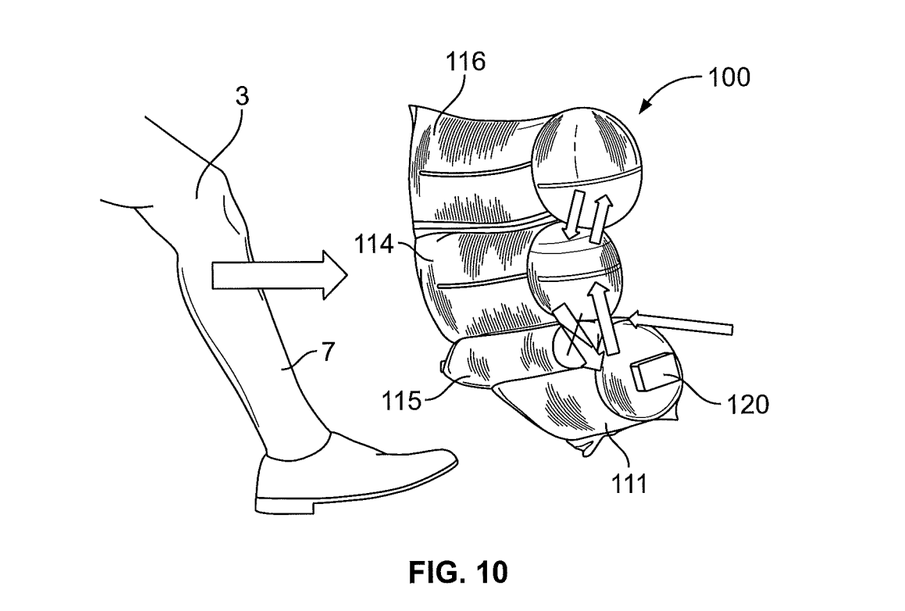
FIG. 10 is a view of the knee airbag when deployed showing the location of a vehicle occupant's leg.

FIG. 10 further illustrates the position of the knee 3 and lower leg 7, particularly the knee 3 and leg 7 directly below the shin and how it will be protected by these production chambers 114, 116 when the air gas flow distribution is shut off from reverse flow. This advantageously maintains the knee airbag 100 protection chambers 114, 116 in a fully inflated condition providing additional protection, not only from the impact of the occupant's knee 3 and lower leg 7 impinging into any obstructions, but also helps restrain the occupant so he doesn't slide forward in the vehicle seat during a collision.

The advantage of the multichamber knee airbag 100 with a one-way valve 130 is it allows the use of a smaller inflator 120 which advantageously lowers the weight and the cost of this assembly. This is true not only of the knee airbag 100, but also in the pedestrian airbag 10 as previously discussed. The smaller inflator 120 means lower cost and lower weight and provides a sufficient amount of inflation gas air flow to completely fill the airbag 100 because the one-way check valve 130 prevents any premature venting of the inflation gases.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag cushion assembly comprising:
   an airbag cushion, the airbag cushion having a plurality of inflatable chambers including a primary fill chamber configured to receive inflation gases, and one or more additional chambers for receiving the inflation gases from the primary fill chamber; and
   wherein the one or more of the additional chambers has one or more one way gas flow check valves for receiving the inflation gases into the one or more additional chambers and preventing the received inflation gases from back flowing to maintain the one or more additional chamber at full inflation when the airbag cushion is inflated, and further wherein the airbag cushion has a front panel and a rear panel, each of the one or more one way gas flow check valves includes a separation wall affixed to an inside surface of the front panel and the rear panel dividing the primary chamber from the one or more additional chambers and sealing the airbag cushion into the plurality of inflatable chambers, said each of the one or more one way check valves being formed as a folded fabric having two or more folds, wherein the folded fabric is affixed at an end opposite the two or more folds and sealed air-tightly peripherally around an entire adjacent portion of the inside surface of the front rear panels thereby forming the separation wall, each of the two or more folds of the folded fabric is cut to form one or more openings or channels, the one or more openings are opened by the inflation gases, but are closed at the two or more folds on any back flow pressure.

2. The airbag cushion assembly of claim 1 wherein the airbag cushion is formed as one large single inflation chamber and the one or more one way gas flow check valves divide the one large single chamber into the primary chamber and the one or more additional chambers.

3. The airbag cushion assembly of claim 1 wherein the separation wall has a width between the front and rear panel to allow the front and rear panel to fully separate on inflation by the width of the separation wall.

4. The airbag cushion assembly of claim 3 wherein the width of the separation wall is sized to maintain the full inflation shape of the airbag cushion when formed as a large single chamber without any separation wall.

5. The airbag cushion assembly of claim 3 further comprises an inflator in communication with the airbag cushion to provide the inflation gases into the cushion.

6. A pedestrian airbag assembly for a vehicle comprising:
an airbag cushion, the airbag cushion extending lengthwise when fully inflated to project in front of a first pillar and a second pillar and across at least a lower portion of a front windshield of the vehicle, the airbag cushion having at least three inflatable chambers including a central primary chamber interposed between a first end chamber and a second end chamber;
an inflator in communication with the airbag cushion for inflating the airbag cushion; and
wherein between the central or primary chamber and each of the first end chamber and the second end chamber are one or more one way check valves for receiving inflation gases into each end chamber from the central chamber and preventing the received inflation gases from each of said end chambers from back flowing and returning into the central chamber when inflated, and further wherein the airbag cushion has a front panel and a rear panel, each of the one or more one way gas flow check valves includes a separation wall affixed to an inside surface of the front panel and rear panel dividing the primary chamber from the one or more additional chambers and sealing the airbag cushion into the plurality of chambers, each of the one or more one-way check valves being formed as a folded fabric having two or more folds, wherein the folded fabric is affixed at an end opposite the two or more folds and sealed air-tightly peripherally around an entire adjacent portion of the inside surface of the front and rear panels thereby forming the separation wall, each of the two or more folds of the folded fabric is cut to form one or more openings or channels, the one or more openings are opened by the inflation gases, but are closed at the two or more folds on any back flow pressure.

7. The pedestrian airbag assembly for a vehicle of claim 6 wherein the fabric of the central or primary chamber is uncoated and the fabric of the first end chamber and second end chamber are coated with an air impermeable sealant.

8. A knee airbag assembly comprises:
a knee airbag cushion having a primary gas distribution inflation chamber for housing an inflator or is formed with a gas inlet for receiving inflation gases and a plurality of additional chambers, each of said additional chambers being attached to an adjacent chamber and having an opening between the adjacent chambers for receiving inflation gases;
an inflator for providing the inflation gases to or into the primary gas distribution chamber the inflator being connected to a gas inlet of the primary gas distribution chamber or positioned within said chamber; and
wherein one or more of the additional chambers has the opening formed with a one way gas flow check valve or receiving the inflation gases on inflation, but preventing back flow or reverse flow back into an adjacent one of the additional chambers or the primary gas distribution chamber, and further wherein the knee airbag cushion has a front panel and a rear panel, each of the one or more one way gas flow check valves includes a separation wall affixed to an inside surface of the front panel and rear panels dividing the primary gas distribution chamber from the one or more additional chambers and sealing the airbag cushion into the plurality of chambers, each of the one or more one way check valves being formed as a folded fabric having two or more folds, wherein the folded fabric is affixed at an end opposite the two or more folds and sealed air-tightly peripherally around an entire adjacent portion of the inside surface of the front and rear panels thereby forming the separation wall, each of the two or more folds of the folded fabric is cut to form one or more openings or channels, the one or more openings are opened by the inflation gases, but are closed at the two or more folds on any back flow pressure.

9. The knee airbag assembly of claim 8 wherein one of the additional chambers adjacent the primary chamber has a one way check valve.

10. The knee airbag assembly of claim 9 wherein the primary gas distribution chamber projects extending from under a dash of a vehicle toward a front seat.

11. The knee airbag assembly of claim 10 wherein each of the additional chambers extends relative to the primary chamber further toward a front seat in a substantially vertically stacked arrangement of adjacent additional chambers.

12. The knee airbag assembly of claim 10 wherein the knee airbag cushion has three of said additional chambers, two outer chambers providing leg protection and occupant restraint and one inner additional chamber forming part of and being adjacent to the primary gas distribution chamber, the inner additional chamber having a one way check valve positioned at the opening between the inner chamber and the adjacent outer chamber.

13. The knee airbag assembly of claim 12 wherein the two outer chambers on full inflation are prevented from back flowing the inflation gases into the inner additional chamber and the primary chamber.

14. The knee airbag assembly of claim 13 wherein the inner additional chamber has a reduced volume relative to the two outer chambers and the primary gas distribution chamber.

* * * * *